United States Patent
Bull et al.

(10) Patent No.: US 11,483,365 B2
(45) Date of Patent: Oct. 25, 2022

(54) METHODS AND APPARATUS FOR THE ENCODING OF AUDIO AND/OR VIDEO DATA

(71) Applicant: BRITISH TELECOMMUNICATIONS PUBLIC LIMITED COMPANY, London (GB)

(72) Inventors: Nicola Bull, London (GB); Yousif Humeida, London (GB); Richard Gedge, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/427,578

(22) PCT Filed: Jan. 30, 2020

(86) PCT No.: PCT/EP2020/052267
§ 371 (c)(1),
(2) Date: Jul. 30, 2021

(87) PCT Pub. No.: WO2020/157183
PCT Pub. Date: Aug. 6, 2020

(65) Prior Publication Data
US 2022/0086211 A1    Mar. 17, 2022

(30) Foreign Application Priority Data

Jan. 31, 2019    (EP) .................................... 19154698

(51) Int. Cl.
*H04L 65/70*    (2022.01)
*H04M 11/06*    (2006.01)

(52) U.S. Cl.
CPC ........... *H04L 65/70* (2022.05); *H04M 11/062* (2013.01)

(58) Field of Classification Search
None
See application file for complete search history.

(56) References Cited

U.S. PATENT DOCUMENTS 7,768,998 B1    8/2010    Everson et al.
8,397,269 B2    3/2013    Barrett et al.
(Continued)

FOREIGN PATENT DOCUMENTS

EP    2 897 337    7/2015
JP    2005184415 A  *  7/2005
(Continued)

OTHER PUBLICATIONS

English translation of Office Action for CN201880064476.8 dated Sep. 29, 2021 (14 pages).
(Continued)

*Primary Examiner* — Jonathan A Bui
(74) *Attorney, Agent, or Firm* — Nixon & Vanderhye P.C.

(57) ABSTRACT

Methods and apparatus are disclosed for selecting an encoding specification for encoding audio and/or video data to be streamed between a user-device (11) and a remote device (28), where the user-device is operable to communicate with the remote device via a digital subscriber line (DSL, 13) for a portion of a path (29) between the user-device and the remote device, the DSL portion (13) extending between a user-side DSL modem device (22) and a DSL aggregation transceiver device (24). The method comprises: at the user-side DSL modem device (22) and/or the DSL aggregation transceiver device (24), collecting performance data in respect of data communications on the DSL portion (13); in dependence on the performance data collected, determining one or more data communication characteristics in respect of data communications on the DSL portion (13); and selecting an encoding specification for encoding the data to be
(Continued)

streamed, the selection being made in dependence on the determined data communication characteristics.

17 Claims, 5 Drawing Sheets

(56) References Cited

U.S. PATENT DOCUMENTS

| | | | |
|---|---|---|---|
| 9,866,610 B2 | 1/2018 | Poulin | |
| 2002/0037715 A1 | 3/2002 | Mauney et al. | |
| 2002/0167936 A1 | 11/2002 | Goodman | |
| 2003/0140159 A1 | 7/2003 | Campbell et al. | |
| 2004/0032860 A1 | 2/2004 | Mundra et al. | |
| 2004/0071216 A1 | 4/2004 | Richardson et al. | |
| 2004/0193974 A1 | 9/2004 | Quan et al. | |
| 2005/0100229 A1 | 5/2005 | Becker | |
| 2005/0201414 A1 | 9/2005 | Awais | |
| 2008/0049624 A1* | 2/2008 | Ray | H04L 69/163 370/241 |
| 2009/0201988 A1 | 8/2009 | Gazier et al. | |
| 2009/0254657 A1 | 10/2009 | Melnyk | |
| 2010/0046664 A1 | 2/2010 | Erving et al. | |
| 2010/0169749 A1* | 7/2010 | Marko | H03M 13/27 714/795 |
| 2011/0317543 A1 | 12/2011 | Medina et al. | |
| 2012/0120043 A1* | 5/2012 | Cho | H04N 19/15 382/232 |
| 2012/0296656 A1 | 11/2012 | Smyth | |
| 2012/0296658 A1 | 11/2012 | Smyth | |
| 2013/0031575 A1 | 1/2013 | Gallant | |
| 2013/0156119 A1 | 6/2013 | Poulin | |
| 2013/0159005 A1* | 6/2013 | Kikuiri | G10L 19/00 704/500 |
| 2013/0215774 A1 | 8/2013 | Bender et al. | |
| 2014/0325020 A1 | 10/2014 | Igarashi | |
| 2014/0337473 A1 | 11/2014 | Frusina | |
| 2014/0375484 A1 | 12/2014 | Jin et al. | |
| 2015/0163273 A1 | 6/2015 | Radcliffe | |
| 2015/0200826 A1* | 7/2015 | Assem | H04M 3/56 370/252 |
| 2015/0222939 A1 | 8/2015 | Gallant | |
| 2015/0271072 A1 | 9/2015 | Moreman et al. | |
| 2016/0227551 A1* | 8/2016 | Freeman | H04W 12/06 |
| 2016/0301960 A1 | 10/2016 | Sze | |
| 2016/0359942 A1 | 12/2016 | Li et al. | |
| 2017/0214791 A1 | 7/2017 | Gedge et al. | |
| 2019/0037173 A1 | 1/2019 | Lee | |
| 2020/0204484 A1* | 6/2020 | Altman | H04L 47/125 |
| 2021/0037080 A1 | 2/2021 | Humeida et al. | |

FOREIGN PATENT DOCUMENTS

| | | | |
|---|---|---|---|
| WO | WO-2006025489 A1 * | 3/2006 | G11B 20/10527 |
| WO | 2007/062418 A2 | 5/2007 | |
| WO | 2007/062418 A9 | 5/2007 | |
| WO | 2019/034640 | 2/2019 | |

OTHER PUBLICATIONS

Examination Report for European Application No. 18 750 463.4 dated Nov. 4, 2021 (7 pages).
"Network model for evaluating multimedia transmission performance over Internet Protocol", ITU-T, Telecommunication Standardization Sector of ITU, G.1050, Series G: Transmission Systems and Media, Digital Systems and Networks, Multimedia Quality of Service and performance—Generic and user-related aspects, Jul. 2016, 114 pages.
A. Lakaniemi, et al., "Subjective VoIP speech quality evaluation based on network measurements", IEEE, 2001, pp. 748-752 (5 pages).
Examination Report for GB Application No. 2001280.3 dated Nov. 20, 2020, 2 pages.
Extended European Search Report for GB Application No. 17186200.6 dated Jan. 31, 2018, 8 pages.
Extended European Search Report for GB Application No. 19154698.5 dated Apr. 8, 2019, 8 pages.
Search Report for GB Application No. 1713012.1 dated Jan. 9, 2018, 5 pages.
Search Report for GB Application No. 2001280.3 dated Jun. 1, 2020, 4 pages.
International Preliminary Report on Patentability for PCT/EP2020/052267 dated Jan. 26, 2021, 12 pages.
Office Action for U.S. Appl. No. 16/639,325 dated Apr. 26, 2021, 6 pages.
International Search Report and Written Opinion of the ISA for PCT/EP2018/071996 dated Sep. 20, 2018, 11 pages.
International Search Report and Written Opinion of the ISA for PCT/EP2020/052267 dated Feb. 26, 2020, 15 pages.
U.S. Appl. No. 16/639,325, filed Feb. 14, 2020 to Humeida et al., entitled "Methods and Apparatus for the Encoding of Audio And/Or Video Data" (40 pages).
Office Action for CN201880064476.8 dated Mar. 14, 2022 with English Translation, 4 pages.

* cited by examiner

METHODS AND APPARATUS FOR THE ENCODING OF AUDIO AND/OR VIDEO DATA

This application is the U.S. national phase of International Application No. PCT/EP2020/052267 filed Jan. 30, 2020 which designated the U.S. and claims priority to EP Patent Application No. 19154698.5 filed Jan. 31, 2019, the entire contents of each of which are hereby incorporated by reference.

TECHNICAL FIELD

The present invention relates to methods and apparatus for the encoding of audio and/or video data, and in particular to methods and apparatus for selecting an encoding specification for encoding audio and/or video data to be streamed on a path across a network between a user-device and a remote device where a portion of the path between the user-device and the remote device is via a digital subscriber line (DSL or xDSL) connection.

BACKGROUND

Digital Subscriber Line (DSL) technology is a technology that can provide or assist in the provision of communications in a telecommunication system having an access network, an access node and a plurality of Digital Subscriber Lines each of which may be used to allow the transmission of data between the access node and one or more user devices or user networks (which may be Local Area Networks or LANs). The transmission of data using DSL technology involves transmission of data signals over metallic conductors such as pairs of wires. DSL technology includes various DSL methods specified in various International Telecommunications Union (ITU) standards and others being developed in the ITU, which may be referred to using the umbrella term "xDSL". Correspondingly, the connections or lines used for communications according to any of the DSL or "xDSL" methods may be referred to as DSL connections or lines, "xDSL connections/lines", or simply as DSLs.

Typically the metallic conductors for a particular DSL connection comprise a pair of wires, usually a twisted metallic pair (usually copper, but it can include lengths of aluminium or other metals) as commonly found within telephone access networks throughout the world. DSL technology takes advantage of the fact that although legacy twisted metallic pairs (which were originally installed merely to provide "Plain Old Telephone Services" (POTS) telephony connections) might only have been intended to carry signals using a differential mode at frequencies of up to a few Kilohertz, such lines can often carry signals reliably at much greater frequencies, and have been found to be suitable for use in the provision of what are generally referred to as "broadband services".

As access networks have evolved to take advantage of fibre-optic technologies, telecommunications network providers have expanded their fibre-optic infrastructure outwards towards the edges of their access networks. While this has generally shortened the lengths of the "final" portions of connections still being provided using metallic twisted pairs (i.e. the portion between the DSL access node and a Customer Premises Equipment (CPE) device of the customer that is nearest to the customer's CPE device), in the majority of cases, at least a portion of such connections are still provided using DSL technology.

Broadband services based using xDSL use a pair of metallic conductors between a Digital Subscriber Line Access Multiplexer (DSLAM) and a modem in a customer's (i.e. subscriber's) property. With Asymmetric Digital Subscriber Line (ADSL) technologies, the DSLAM is located in an exchange and the line can typically be up to 7 km in length. With Very-high-bit-rate Digital Subscriber Line (VDSL) technologies, the DSLAM is generally located in a local cabinet with the line being much shorter, typically a maximum of 2 km. The xDSL service is optimised using Dynamic Line Management (DLM), which generally aims to select the best compromise or a most appropriate balance between such competing characteristics as speed and stability for each individual line.

Like other communications technologies, DSL communications are affected by interference and physical impairments of the copper (or other such metal) pair used for transmission. These problems can cause errors in the data stream. To counter these problems, techniques such as Forward Error Correction (FEC) and Interleaving are used. However, errors still occur and can cause lost packets which can affect applications or services using the broadband line. The TCP/IP protocol (Transmission Control Protocol/Internet Protocol) generally handles such errors by re-transmitting the lost packets. The UDP (User Datagram Protocol) used for most multimedia services does not provide for re-transmission, however, so lost packets are not re-transmitted, which may affect higher-layer applications.

In general, an xDSL system continually monitors its own performance and reports this using a format specified by the appropriate ITU Recommendation G997. Such reports generally include items such as the number of errors, the signal-to-noise ratio, the number of packets with errors corrected using FEC, etc. These measurements are normally used for diagnosing problems with the line and also in DLM decisions to optimise speed and stability. Historical (i.e. past) data is generally also available allowing the past performance of a line to be assessed.

Voice-over-Internet Protocol ("VoIP") and Internet Protocol television ("IPTV") are examples of IP Multimedia services where the content is coded, packetized and delivered over packet-switched networks such as the Internet. The IP packets effectively transport multimedia streams using different media delivery protocols such as the UDP. The end-to-end quality of these IP Multimedia services is often characterised by the performance in the presence of particular characteristics of IP network parameters such as packet loss, jitter, throughput and delay. It is important for Service Providers to monitor and measure the performance of their services. Such performance measurement and monitoring information can be used for diagnosing problems with current customers' services and/or for provisioning new services for new customers.

A range of commercial monitoring tools are used by service providers. The "SamKnows" technique provides end-to-end performance benchmarks for broadband networks worldwide, using dedicated probes in the premises of a large sample of customers. These probes can be in the form of physical hardware installed at customer premises or as software installed at customer Broadband gateway devices. They actively establish test sessions using different network protocols to measure average packet loss, jitter and round-trip delay over long periods of time using short duration test calls and sessions.

Even though such systems can provide end-to-end performance measurements for different services and highlight the presence of potential quality problems, they don't provide any diagnostic insight to the root cause of that problem. For example, a SamKnows probe can indicate that some packets have been lost during a multimedia streaming session but it does not indicate whether these loses we caused by congestion in the core network or by errors and interference on the xDSL line.

Furthermore, characterising the performance of a particular Broadband line using such monitoring tools would need such probes to be installed in the line, and would need data to be collected over a long period of time before the performance could usefully be measured, making this an unattractive solution for actions such as provisioning multimedia services for new customers. On the other hand, xDSL systems continually monitor their performance and can potentially provide very useful historic insights which can be used for accurately estimating the potential performance of a new IP service.

Technologies such as SamKnows report IP layer service-related metrics such as packet loss, jitter and delay, whereas xDSL reports physical layer (interface) related statistics such as errored seconds, severely errored seconds, and signal-to-noise ratio. Many models have been developed for measuring the performance of different multimedia services using IP layer metrics. For example, the well-known E-model, which is an ITU-T standard, is a well-established voice-quality testing system for assessing the performance of VoIP services with regard to different IP layer impairment characteristics such as packet loss, delay and jitter. On the other hand, the relationship between the xDSL reports and quality of services is not well studied or understood, and if xDSL data is to be used for optimising the performance of different multimedia services, it is important to develop models which will accurately estimate the quality of these services with the performance of different xDSL technologies.

Referring briefly to prior disclosures, United States patent application US2017/0214791 (from the current applicant) relates to techniques for managing a digital subscriber line, and in particular to a method of determining an optimum point at which to trigger a line test.

US2004032860 ("Mundra et al") relates to techniques for changing a codec in real-time during transmission of a "Voice-Over-Packet" (VOP) call placed over a packet-switched network such as the Internet.

US2009201988 ("Gazier et al") relates to techniques for video processing, such as transcoding, storage, quality-testing and the like, in network edge devices.

US20130156119 ("Poulin") relates to techniques for selecting a codec pair for two nodes trying to communicate through a digital communication network. The method includes steps occurring at a network node, which has first and second communication interfaces. The steps include obtaining a first performance metric indicating a condition of a first network connected to the network node via the first communication interface, the first network having a first endpoint, and obtaining a second performance metric indicating a condition of a second network connected to the network node via the second communication interface, the second network having a second endpoint. The steps further include generating or updating a codec selection model based on the obtained first and second performance metrics; selecting a first codec from a plurality of codecs compatible with the first endpoint based on the codec selection model; selecting a second codec from a plurality of codecs compatible with the second endpoint based on the codec selection model, and utilizing the first and second selected codecs to communicate a portion of a communication session between the first endpoint and the second endpoint.

US20080049624 ("Ray et al") relates to techniques for adjusting the window size of a TCP packet on a packet network including a sending network element in communication with a receiving network element for transmitting and receiving data packets between the sending and receiving network elements. At least one of the sending and receiving network elements is configured to determine network performance information of the packet network; concatenate the network performance information into the data packets; and adjust the window size of the TCP packet based on the network performance information.

US2011317543 ("Medina et al") relates to an architecture for scaling content resolution in order to mitigate errors in a provisioned service of a communication network, such as a wireless service or a femtocell service that integrates with DSL or other broadband carriers. The architecture can identify fault conditions relating to bandwidth oversubscription or symbolization integrity, for example, and based thereon, can alter encoding format codecs of certain types of content in order to reduce their resolution/quality.

US2004071216 ("Richardson et al") relates to techniques for delivering video over a network. It involves separating the digitally compressed video signal into multiple sub-signals, coding each of the sub-signals, transmitting each of the sub-signals over asynchronous transfer mode (ATM) paths, receiving each of the sub-signals, and selecting certain said sub-signals according to a bandwidth suitable for subsequent reception over a DSL path.

US2010046664 ("Erving et al") relates to multi-frequency data transmission channel power allocation and to a communication device with inner and outer coders which transmits digital data over frequency channels. The technique involves obtaining a characteristic of the frequency channels, and selecting performance parameters of the inner and outer coders for each channel based in part on the obtained characteristic of the channel. The performance parameter selecting step includes storing, for each of a plurality of combinations of inner and outer coder performance parameters, a corresponding transmission power requirement, and selecting a combination of inner and outer coder performance parameters by selecting a transmission power requirement, based on a multi-channel efficiency over respective data rates. Data is allocated to be transmitted to each channel.

SUMMARY OF THE INVENTION

According to a first aspect of the invention, there is provided a method of selecting an encoding specification for encoding audio and/or video data to be streamed between a user-device and a remote device, the user-device being operable to communicate with the remote device via a digital subscriber line for a portion of a path between the user-device and the remote device, said portion extending between a user-side digital subscriber line modem device and a digital subscriber line aggregation transceiver device, the method comprising:

at either or both of said user-side digital subscriber line modem device and said digital subscriber line aggregation transceiver device, collecting performance data in respect of data communications at a plurality of different times on the digital subscriber line between the user-side digital subscriber line modem device and the digital subscriber line aggregation transceiver device;

in dependence on the performance data collected in respect of data communications at said plurality of different times on the digital subscriber line between the user-side digital subscriber line modem device and the digital subscriber line aggregation transceiver device, determining one or more data communication characteristics in respect of data communications over a monitoring period including said plurality of different times on the digital subscriber line between the user-side digital subscriber line modem device and the digital subscriber line aggregation transceiver device; and selecting an encoding specification for encoding said data to be streamed between said user-device and said remote device, the selection of said encoding specification being made in dependence on the data communication characteristics determined in respect of data communications over said monitoring period on the digital subscriber line.

Embodiments of the invention are of use in relation to two-way communication sessions (e.g. two-party VoIP sessions) as well as to multi-party VoIP audio-conferences and other scenarios, but may also be used for the selection of an appropriate encoding specification for a one-way communication session. In such cases, the selection of an appropriate encoding specification may involve selecting an encoding specification for a "sending" party according to the above method, and may also involve selecting a decoding specification for a "receiving" party, the selection of a decoding specification for the "receiving" party being dependent primarily or even completely on the selection of the encoder specification made for the "sending" party. The same "codec" may be selected for each where applicable.

In general, the choice of what decoding specification to use for each/any party that is going to be a "receiving" party will be dependent at least primarily on the encoding specification chosen for the "sending" party, in that it would ideally be the decoder-part of the codec specification chosen for the "sending" party to use for its encoding. It may need to be different to that chosen for the "sending" party, if for example the "receiving" party is unable to use the decoder-part of the same codec (for compatibility reasons or otherwise), or because a different codec is more appropriate for the "receiving" party on account of it also being a "sending" party whose own encoding considerations over-ride its decoding considerations. If it needs to be different, it may be appropriate to take a separate "encoding specification" decision for each party, then to choose an appropriate transcoder (if necessary) in dependence on the respective encoding specifications.

Embodiments of the invention are of particular use in relation to the selecting of an encoding specification for a communication session prior to the initiation of that communication session. This may be done purely on the basis of performance data collected in respect of data communications at a plurality of different times on the digital subscriber line in question prior to the initiation of the communication session in question, but it will be appreciated that performance data collected in respect of data communications on the digital subscriber line during a communication session may also be used, and may even trigger a change to a different encoding specification during the communication session.

According to preferred embodiments the selection step may be performed at the user-side digital subscriber line modem device and/or at the digital subscriber line aggregation transceiver device.

According to preferred embodiments, the one or more data communication characteristics in respect of data communications on the digital subscriber line between the user-side digital subscriber line modem device and the digital subscriber line aggregation transceiver device may be provided by the user-side digital subscriber line modem device and/or by the digital subscriber line aggregation transceiver device to a remote service optimisation processor for use in the selection step.

According to preferred embodiments, the one or more data communication characteristics in respect of data communications on the digital subscriber line between the user-side digital subscriber line modem device and the digital subscriber line aggregation transceiver device are provided to the user-device and/or to the remote device by the user-side digital subscriber line modem device and/or by the digital subscriber line aggregation transceiver device for use in the selection step.

According to either of the above options, the selected encoding specification and/or an indication thereof may be provided to said user-device and/or said remote device.

According to preferred embodiments, the step of selecting an encoding specification may comprise selecting a coding technology. Alternatively or additionally, the step of selecting an encoding specification may comprise selecting one or more encoding parameters for use in encoding audio and/or video data using the selected or a pre-selected coding technology, said one or more encoding parameters controlling or affecting one or more of bit-rate, packet loss concealment or forward error correction for the streaming of said audio and/or video data.

According to preferred embodiments, the method may further comprise selecting a decoding specification for decoding audio and/or video data that has been streamed between said user-device and said remote device. With such embodiments, the decoding specification may be selected in dependence on the encoding specification selected for encoding said audio and/or video data to be streamed between said user-device and said remote device. As an alternative, a decoding specification may be selected first (i.e. directly in dependence on the data communication characteristics determined in respect of data communications on the digital subscriber line), with the encoding specification being selected in dependence on the selected decoding specification. As another alternative, a combined encoding and decoding specification may be selected in dependence on the data communication characteristics determined in respect of data communications on the digital subscriber line, or (corresponding) encoding and decoding specifications may be selected together.

According to preferred embodiments, the method may further comprise using the selected encoding specification at said user-device and/or said remote device to encode said data to be streamed between said user-device and said remote device. With such embodiments, the method may further comprise streaming the encoded data between said user-device and said remote device via the digital subscriber line.

According to preferred embodiments, the communication characteristics in respect of data communications on the digital subscriber line between the user-side digital subscriber line modem device and the digital subscriber line aggregation transceiver device may include one or more characteristics selected from the following:

characteristics associated with communication speed;
characteristics associated with communication delay and/or delay variation;

characteristics associated with reliability;
characteristics associated with data loss;
characteristics associated with communications quality.

According to preferred embodiments, the user-device may be located in a local area network and the remote device is located in an external communications network outside said local area network, the user-device being operable to communicate via at least one local area network gateway device with the remote device.

According to a second aspect of the invention, there is provided apparatus for performing methods according to the first aspect.

According to a third aspect of the invention, there is provided a computer program element comprising computer program code to, when loaded into a computer system and executed thereon, cause the computer to perform the steps of a method according to the first aspect. The various options and preferred embodiments referred to above in relation to the first aspect are also applicable in relation to the second and third aspects.

Preferred embodiments of the invention use data communication characteristics determined in respect of an xDSL line (such as its signal-to-noise ratio, line speed, errored seconds, severely-errored seconds, etc.) that forms an intermediate portion of an end-to-end path over which an end-to-end IP multimedia application (such as VoIP, Multicast IP TV, etc.) is being or is to be provided. Preferred embodiments use the data communication characteristics determined in respect of the intermediate xDSL portion and collected at different times or at least in respect of performance at a plurality of different times at either or both of the xDSL devices at the respective ends of the xDSL portion, thus allowing the xDSL performance data collected at the xDSL devices in respect of the intermediate xDSL portion to be used to influence the selection of different features and configurations (such as coding technology, bit-rate, packet loss concealment, forward error correction, etc.) to be applied in respect of the IP multimedia application over the end-to-end path between the user device and the remote device to improve or optimise the quality of service for the IP multimedia application on that end-to-end path.

Preferred embodiments make use of the fact that xDSL systems continually monitor their performance on an ongoing basis, and that data from such ongoing monitoring can potentially provide very useful historic insights which can be used for accurately estimating the potential performance of a new IP service. Using data in respect of performance of an xDSL portion over a period of time (i.e. collected at a plurality of times (preferably current, recent and historic) or in respect of performance of the xDSL portion over a period of time, thereby reflecting past (i.e. recent and/or historic) performance over a period of time rather than just instantaneous/current performance, allows for better selection of an encoding specification than an instantaneous "snapshot" of such data would allow.

Embodiments of the invention may be configured to provide an indication that a customer's line is not in fact suitable for a particular IP multimedia service under consideration if, for example, it is determined that there is no encoding specification available that could be used to encode the data required to be streamed between the user-device and the remote device which would result in the data being streamed via the line in question at or above a threshold performance level.

Embodiments of the invention can also be used to optimise the performance of an IP multimedia service at the beginning when the service is first provisioned but can also be used to continuously monitor the performance of the line and change the multimedia service configuration to optimise its performance. This can be done as frequently as once every session or even used to perform in-session service optimisation.

BRIEF DESCRIPTION OF THE DRAWINGS

A preferred embodiment of the present invention will now be described with reference to the appended drawings, in which.

DESCRIPTION OF PREFERRED EMBODIMENTS

With reference to the accompanying figures, methods and apparatus according to preferred embodiments will be described.

Figure 1:
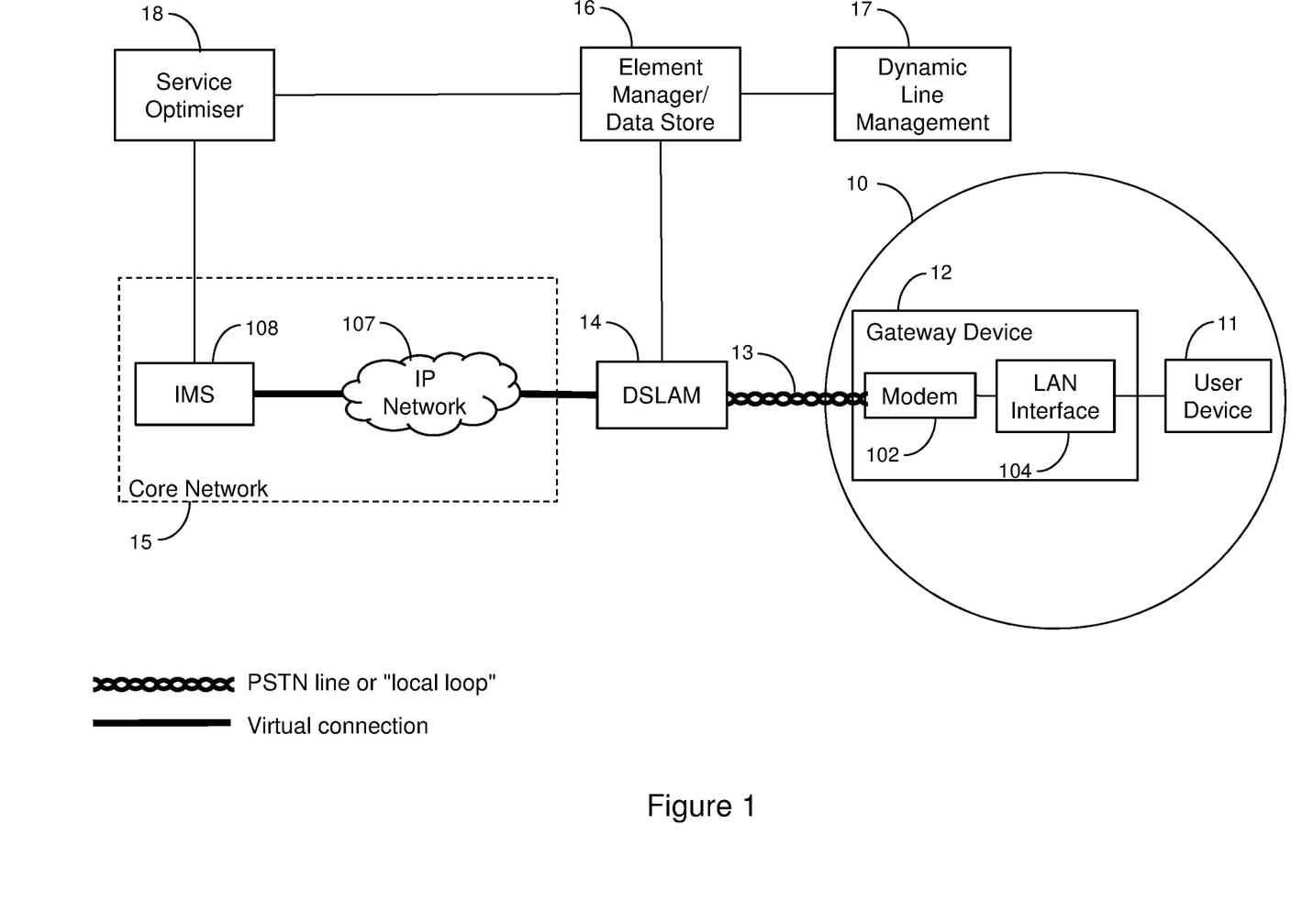
FIG. 1 shows an IP-based network that can be used to deliver a multimedia service to a customer's user device.

FIG. 1 illustrates a simplified diagram of an overall IP-based network that can be used to deliver an IP multimedia service to a customer's user device 11. In this example, the customer is located in a local area network (LAN) 10 via which the user device 11 may communicate with entities outside the LAN 10, but it will be understood that in other scenarios, the user device need not be in a LAN.

This overall IP-based network comprises an access network (which, in the case of LAN 10, generally comprises a PSTN line 13 or "local loop" acting as a Digital Subscriber Line (xDSL, sometimes simply referred to as a DSL) connection extending between a modem 102 of a LAN Gateway Device 12 and a Digital Subscriber Line Access Multiplexer (DSLAM) 14), and a core network 15 (which in this example, comprises an IP network 107 and an IP Multimedia Server (IMS) 108).

In this example, and as is shown in FIG. 1, the customer uses the user device 11 in the local area network (LAN) 10 to connect via the Gateway Device 12 and further via the access network and core network 15 to the IP Multimedia Server 108 to consume the multimedia service. The user device 11 can be a dedicated consumer device (such as a VoIP phone, or a TV set-top box (STB)) or may be a general purpose computing device (e.g. a smart-phone or a laptop) running a client application.

The performance of the digital subscriber line over the DSL connection 13 (i.e. between the modem 102 of the LAN Gateway Device 12 and the DSLAM 14) is continuously monitored, with performance data being at different times or at least in respect of performance of the connection at a plurality of different times, with performance statistics being collected at the DSLAM 14 and/or at the Gateway Device 12 before being sent to an Element Manager/Data Storage system 16. This line performance data is usually used by a Dynamic Line Management (DLM) system 17 to optimise the performance of the line for speed and stability.

While performance statistics in respect of the performance on the digital subscriber line over the DSL connection 13 may (as indicated above) be collected at the DSLAM 14 and/or at the Gateway Device 12, they are generally collected at the DSLAM 14, as this is generally under the control of the ISP or other such communication service provider responsible for the DSL connection 13 and for providing internet services to the customer in question, or is at least in communication with an entity acting on behalf thereof. Part of the ITU-T digital subscriber line specification includes a mandatory section entitled "Physical layer management for digital subscriber transceivers" (G.997.1). This specifies how each transceiver must collect performance parameters in respect of the DSL line, including parameters obtained during line synchronisation and during operation, which together allow monitoring of how well the service is working. The specification also mandates that parameters are reported real-time and over 15-minute and 24-hour time periods. In a two-way communications link with a transceiver at each end some parameters can only be measured at the receiving end of the link, e.g. received signal level. Such information may be needed by the other end, so it can adjust the transmit power to match the loss of the link, for example. Part of the standard therefore specifies a virtual communications channel between transceivers and a protocol for exchanging parameters so both that ends of the link may be aware of all measurements of which they need to be aware.

This collected performance data is particularly useful for the Service Provider and is therefore extracted from the DSLAM and stored in Operation Support Systems (OSS). The length of time this data is kept may be determined by the Service Provider but it is normal to keep at least 14 days' worth of data. Service Providers may use a system based on a number of entities called Element Managers, each of which "manages" a number of DSLAMs and also collects the performance data. This performance data may then be used by other OSS systems, e.g. by a Dynamic Line Management (DLM) system 17 to manage and operate the Broadband xDSL network. As mentioned earlier the performance data is generally shared between transceivers so that the data collected at the DSLAM 14 is also available at the gateway device 12, and vice versa. This means that a user device 11 connected to the gateway device 12 can access this performance data by interrogating the gateway device 12 directly OR by interrogating the Element Manager 16 via the network.

The above discussion of the collection at a DSLAM and/or at a Gateway Device of performance data in respect of a DSL connection and its subsequent use relate to the performance data being used (by a DLM system, for example) to adjust parameters controlling or affecting the performance of the DSL connection in question, to select or create a DLM profile having a set of parameters offer a suitable compromise between speed and/or stability on the DSL connection, for example.

As will now be explained, preferred embodiments of the invention make use of such performance data in respect of a DSL connection collected at a DSLAM and/or at a Gateway Device at one or both ends of the DSL connection in question for a different, generally additional purpose.

It will be appreciated that while the entities at the respective ends of the DSL connection (i.e. the DSLAM 14 and the modem 102 in the Gateway Device 12, in the example shown in FIG. 1) are essentially the endpoints of the DSL connection 13, they are not generally the endpoints in respect of a service such as a Voice-over-IP (VoIP) or multimedia streaming service provided between a user device 11 and a remote device such as an IP Multimedia Server (IMS) 108 or a user device of another user in another location.

Preferred embodiments relate to such scenarios, and to techniques which may be used to adjust, improve or optimise the use of audio and/or video encoding (and, where appropriate, associated decoding) resources (e.g. codecs) when data is to be encoded then streamed over a network.

Currently, VoIP and multimedia services generally adapt their data rate to optimise communication quality for the end-to-end (i.e. sender-to-receiver) connection they are operating over based on "end-to-end" characteristics, which can be measured at one or both "ends" (i.e. the sender and/or the receiver of the encoded, streamed data). Where the end-to-end connection includes an intermediate Digital Subscriber Line (DSL) portion (i.e. a broadband line such as the DSL connection 13 in FIG. 1) bounded by a user-side DSL modem (such as the modem 102 in the Gateway Device 12) and a DSL aggregation transceiver device (such as DSLAM 14), the DSL portion may present specific data communication characteristics due to (for example) copper line length, copper line quality, electromagnetic interference, and other factors affecting performance on the DSL connection. Such data communication characteristics can generally be determined from performance data measured at or obtained by the DSL modem and/or the DSL aggregation transceiver device, and made available from one or both of those DSL devices to an Internet Services Provider (ISP), who may own one or both DSL devices, and/or to the user.

Preferred embodiments use such data communication characteristics determined in respect of the (intermediate) DSL portion of an end-to-end (i.e. sender-to-receiver or peer-to-peer) connection to allow selection and/or optimisation of appropriate encoding (and, where appropriate, associated decoding) resources (e.g. codecs), allowing these to be selected such as to offer improved quality of service for the "end-to-end" connection in question. The selection and/or optimisation of the codec may be performed by an ISP on behalf of its customers, for example. In an alternative, it may be performed by a customer-controlled device, however.

The selection and/or optimisation of the codec may be performed using an algorithm for example, or using a look-up table of codecs, matching these to one or more data communication characteristics in respect of data communications on the DSL connection 13 that is to make up an intermediate portion of the end-to-end streaming path between the user-device 11 and the remote device 108, that intermediate DSL portion 13 extending between the user-side DSL modem device 102 and the DSLAM 14. It will be noted that the data communication characteristics in respect of data communications on the DSL connection 13 would not generally be directly available to either of the devices at the ends of the end-to-end streaming path (i.e. the user-device 11 and the remote device 108 in this example), being collected at (and therefore generally being directly available only at) the user-side DSL modem device 102 and the DSLAM 14, which are the DSL end-points of the DSL connection in question. The data communication characteristics in respect of data communications on the DSL connection 13 may not be available to the user-device 11 or the remote device 108 at all, but according to preferred embodiments, performance data collected in respect of data communications on the DSL connection 13 may be used (at either or both of the DSL end-points or at an entity to which the collected performance data is provided) to determine those data communication characteristics, which may then be used to select an encoding specification.

Figure 2:
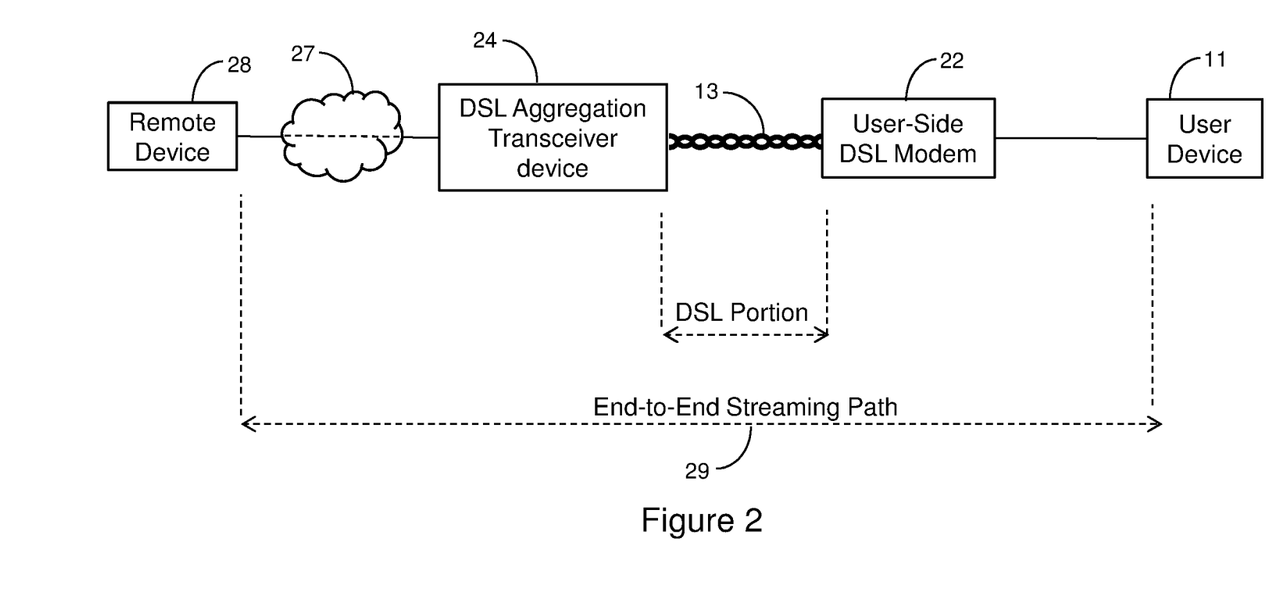
FIG. 2 is a simplified representation of the primary four entities on an end-to-end path such as that shown in FIG. 1.

FIG. 2 is a simplified representation of the primary four entities on an end-to-end path such as that shown in FIG. 1, which may be used for streaming audio and/or video data between a user device 11 and a remote device 28 (which may be an IMS 108 such as that shown in FIG. 1, a user device of another user in another location, or another such remote device). The end-to-end path between the user device 11 and a remote device 28 passes via the intermediate DSL portion 13 which itself is bounded on the user-device side by a User-Side DSL modem, and on the remote-device side by a DSL aggregation transceiver device 24 (which may be a DSLAM 14 such as that shown in FIG. 1, another type of DSL aggregation transceiver device (e.g. a mini-DSLAM) or similar), the remote device 28 being able to communicate with the DSL aggregation transceiver device 24 via a network 27 such as the IP network 107 as shown in FIG. 1. It will be apparent that the DSL portion 13 forms a clearly-bounded intermediate section of what becomes an end-to-end streaming path or connection 29 when data is being streamed between the user device 11 and the remote device 28.

Figure 3:
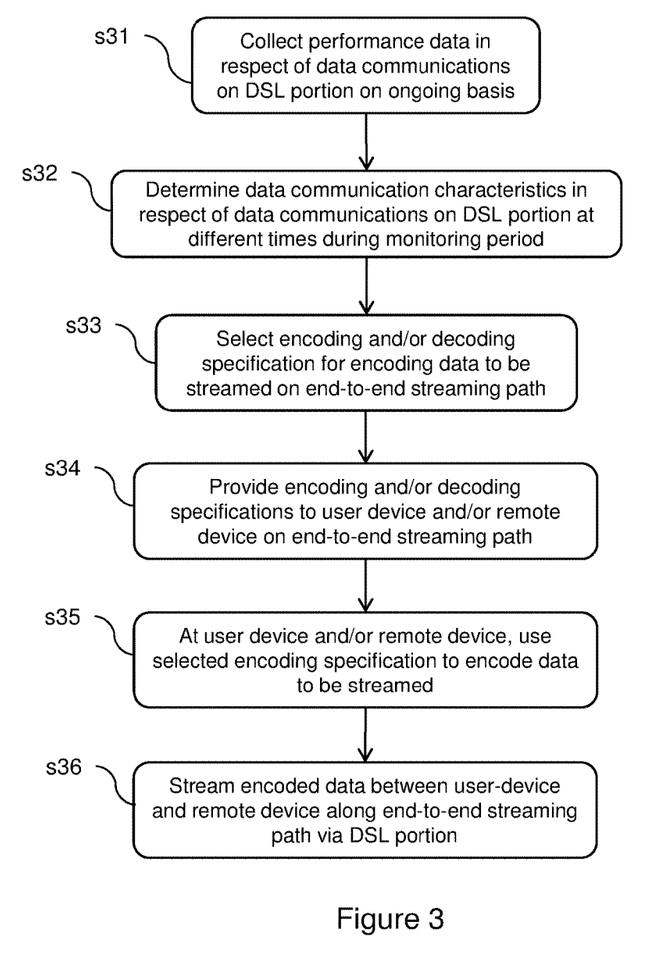
FIG. 3 illustrates steps which may be performed when performing a method according to an embodiment of the invention.

Referring now to FIG. 3, this illustrates steps which may be performed when performing a method according to an embodiment of the invention in order to allow an encoding specification to be selected for the encoding of audio and/or video data to be streamed between a user-device 11 and a remote device 28 such as those shown in FIG. 2, where the user-device 11 is operable to communicate with the remote device 28 via a digital subscriber line 13 for a "DSL portion" of the end-to-end streaming path 29 between the user-device 11 and the remote device 28, the DSL portion 13 extending between a user-side DSL modem device 22 and a DSL aggregation transceiver device 24.

In step s31, performance data is collected in respect of data communications on the DSL portion 13. This is done on an ongoing basis (i.e. at a number of different times), so the performance data collected will relate to and be indicative of performance of the DSL portion 13 at a plurality of different times over a monitoring period, and will thus characterise the performance of the connection not just at a precise moment, but over the monitoring period, which may include periods of congestion, instability or other factors. The monitoring period may be a defined period, which may be defined by the available storage capacity for collected performance data, and may include performance data in respect of data communications on the DSL portion up to and including the tine at which it is desired to select an encoding specification. The performance data may be weighted, using an exponentially-weighted moving average, for example, or may be unweighted so as to give equal weight to performance at different times during the monitoring period, at different times of day and under different conditions.

The performance data may be collected at the user-side DSL modem device 22, at the DSL aggregation transceiver device 24, or at both. The collected DSL performance data may be provided to a separate processing device such as a service optimiser 18 (shown in FIG. 1 and discussed below), retained for processing at the device at which it has been collected, or provided to the user-device 11 and/or the remote device 28.

In step s32, at a service optimiser 18 or elsewhere, one or more data communication characteristics in respect of data communications on the DSL portion 13 are determined, this being done in dependence on the DSL performance data collected in respect of data communications on the DSL portion 13 over the course of the monitoring period.

In step s33, an encoding specification for encoding audio and/or video data to be streamed over the end-to-end streaming path 29 between the user-device 11 and the remote device 28 is selected, the selection being made in dependence on the data communication characteristics determined in respect of data communications on the DSL portion 13 of the end-to-end streaming path 29. A corresponding decoding specification (for decoding data encoded using the selected encoding specification) may also be selected. The selection may simply be of a codec comprising associated encoding and decoding specifications.

In step s34, the selected encoding and/or decoding specifications may be provided to the user device 11 and/or to the remote device 28 on the end-to-end streaming path 29. Where the streaming of data is to be in just one direction (e.g. for streaming of audio/video content from a remote server to the user device), it may be unnecessary to provide the selected encoding specification to the user device 11 and to provide the selected decoding specification to the remote device 28. Where the streaming of data is to be in both directions (e.g. for an audio/video call or conference between remotely-located user devices), it may be appropriate to provide both specifications to both devices.

In step s35, data to be streamed between the respective devices along the end-to-end streaming path 29 is then encoded by the device that is to act as the sending device, using the selected encoding specification. (It will be appreciated that where the streaming session in question is to be a two-way call, each device will act as a sending device as well as a receiving device, so each will perform encoding. In general, they would do this using the same encoding specification, but it is foreseeable that each could use its own selected encoding specification.)

In step s36, data encoded by one device using the selected encoding specification is streamed between the respective devices along the end-to-end streaming path 29 via the DSL portion 13 before being received at the other device and decoded using the corresponding decoding specification.

Referring again to FIG. 1, according to the presently-described embodiment and as indicated earlier, a further unit may be included in the network architecture, which will be referred to as the Service Optimiser 18. Its purpose is to optimise the features and configuration of a multimedia service provided by the IP Multimedia Server 108 by retrieving the performance data in respect of the customer's DSL connection 13 from the Element Manager/Data Store 16, analysing the data and then specifying the optimum service configuration. It then communicates this information to the IP Multimedia Server 108, at which the selected service configuration (the encoding specification for data to be streamed to the user device 11, for example) can be used. Where appropriate, it may also communicate corresponding information to the user device 11 (the corresponding decoding specification for the data after it has been streamed to the user device 11, for example).

It will thus be appreciated that DSL performance data collected at a DSLAM (or another such DSL aggregation transceiver device) and/or at a user-side DSL modem (e.g. in a LAN Gateway Device or elsewhere) may simply be sent to a service optimiser or other such external device (via an Element Manager, for example), but may (additionally or alternatively) be used autonomously or "locally" by an app on a user device and/or by a server device providing an online or networked service such as the IP Multimedia Server 108, for example.

Figure 4:
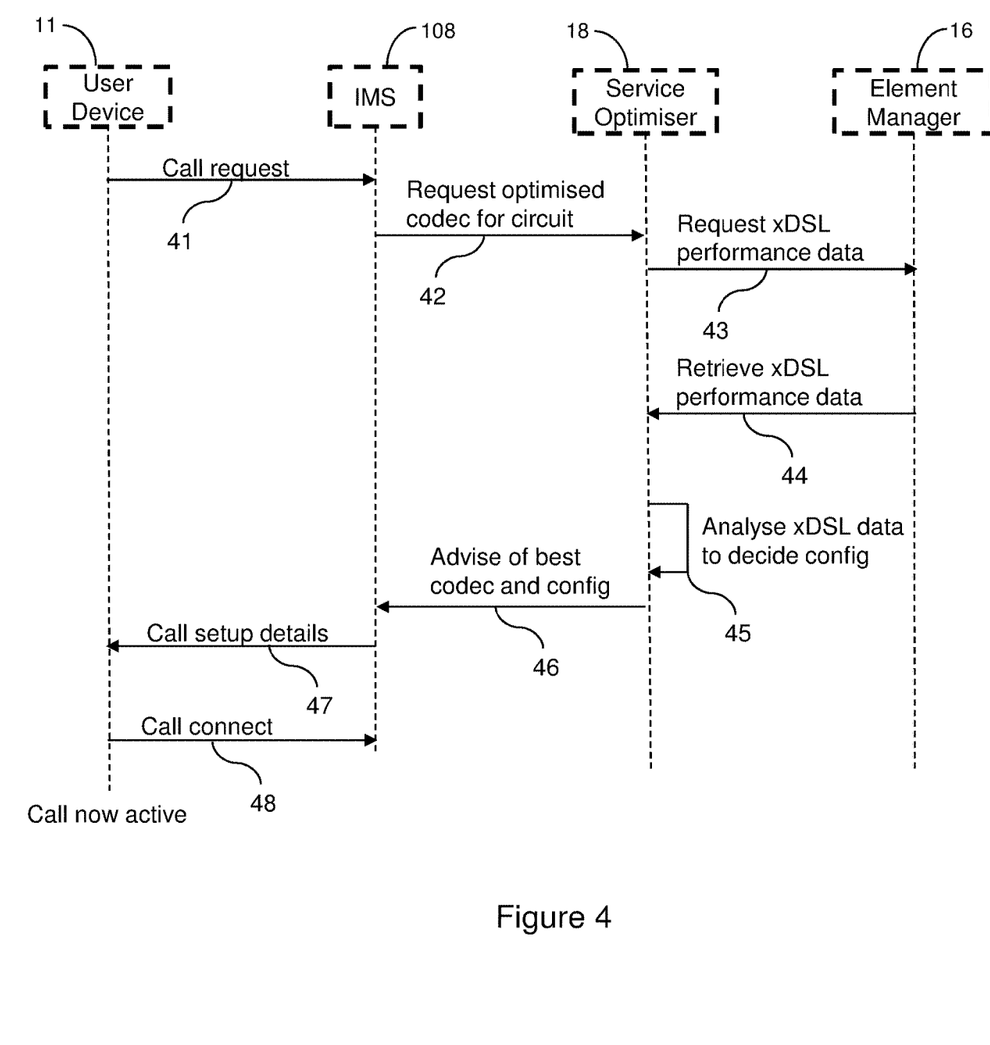
FIG. 4 is an interaction diagram illustrating possible steps and interactions which may be used to improve or optimise service using a method according to a preferred embodiment.

FIG. 4 is an example of possible steps that could be used to achieve an improved or optimised service using a method as set out above. In this example, a customer, using a device such as user device 11 in FIG. 1, wishes to consume a particular IP multimedia service. The user device 11 sends a session initiation request 41 to the IP Multimedia Service 108. In normal circumstances this would generally involve some signalling messages between the user device 11 and the IMS 108 to authenticate the customer or client identity and also to negotiate and decide how the media is going to be configured and encoded. However, in this embodiment the IMS 108 sends a request 42 to the Service Optimiser 18 to optimise the service according to the performance of that customer's xDSL connection. The Service Optimiser 18 then sends a request (interaction 43) to the Element Manager/Data Store 16 to retrieve the customer's xDSL performance data (interaction 44). The Service Optimiser 18 then analyses the xDSL data (which may include current as well as recent and/or historic measurements) and uses a model to determine (interaction 45) how the service should be configured. Different Multimedia Services may have different models that can be used to optimise these services according to the performance of the line. Once the data is analysed and the preferred service configuration is decided, this information is passed (interaction 46) on to the IP Multimedia Server 108 which in turn makes use of this data and makes decisions on how the service should be configured for the user device 11. It then sends the session set-up details back (interaction 47) to the user device 11 which can then successfully connect and start the session (interaction 48). The session (i.e. streaming, a call, or other such session) is then active.

As mentioned earlier, methods and systems according to preferred embodiments of the invention can be used to measure the expected service quality for different customers depending on their xDSL performance without the need to connect the service and measure its performance. The same embodiment shown in FIG. 4 can be used for provisioning a service for the first time. For example, if the customer wants to use a multimedia service for the first time, then the IP Multimedia Server 108 can send a request to the Service Optimiser 18 to calculate the expected quality for that customer's line. The Service Optimiser 18 then collects the xDSL data from the Element Manager/Data Store 16, analyses this xDSL data (preferably including current as well as recent and/or historic measurement) and uses an appropriate performance model to measure the expected quality for the specific multimedia service. This information is then sent back to the IP Multimedia Server 108 which then makes a decision based on this information. If the estimated quality meets the minimum requirements for provisioning this service then the server can offer it to the customer.

The Service Optimiser 18 can communicate the results back to the IP Multimedia Server 108 in different ways. If the configuration of the multimedia service is solely decided depending on its performance in the access network, then the Service Optimiser 18 can be used to send back the information about the optimum configuration with the best quality, as indicated in FIG. 4. In some scenarios, decisions regarding the configuration of multimedia services may need to be (or may benefit from being) based on a multitude of factors, such as cost (e.g. licensing fees), interoperability (e.g. transcoding). In such cases, the Service Optimiser 18 unit can be used to send back quality measures and indicators for all the different configurations that the server is able to support and leave the server to decide on which one to choose.

Figure 5:
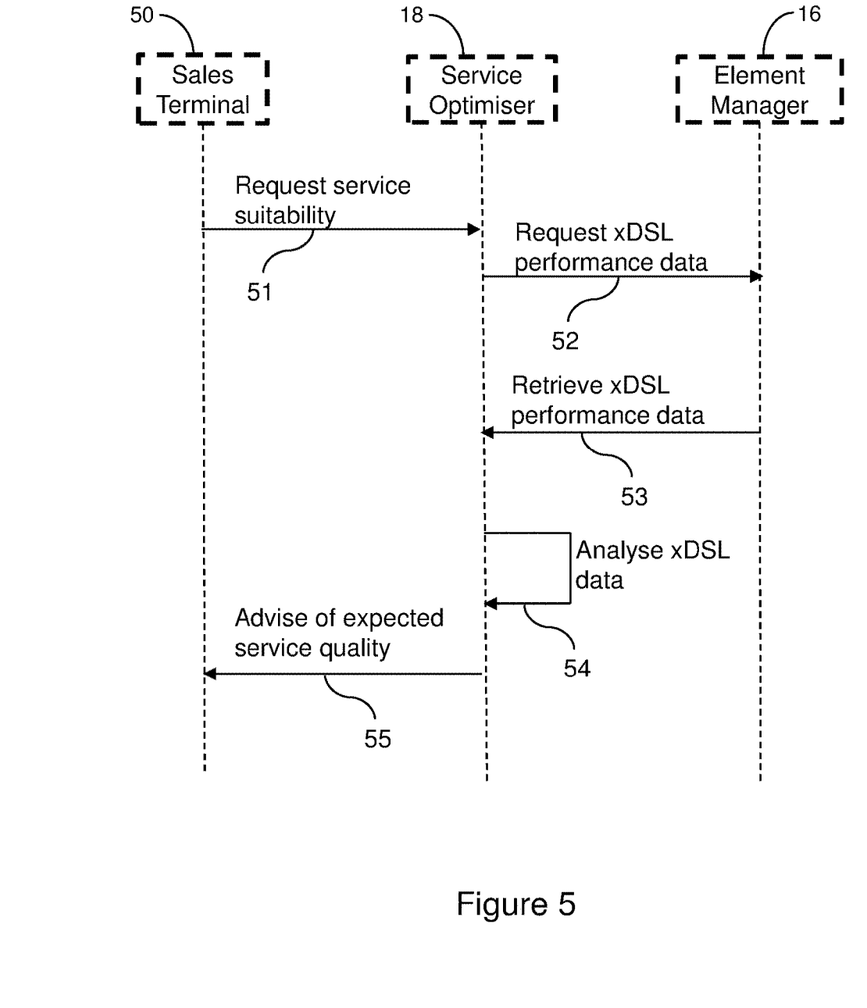
FIG. 5 shows am alternative process to that illustrated in FIG. 4.

In some scenarios, it is also possible that the service would need to be checked as a pre-sales activity, perhaps by an adviser. FIG. 5 shows by way of example a simplified process where the Service Optimiser 18 is asked by an advisor at a sales terminal 50 to check the service suitability (interaction 51). In a manner corresponding to that indicated in FIG. 4, the Service Optimiser 18 sends a request (interaction 52) to the Element Manager/Data Store 16 to retrieve the customer's xDSL performance data (interaction 53). The Service Optimiser 18 then analyses the xDSL data (54), and in dependence on the analysis, provides the expected service quality back to the sales terminal 50 (interaction 55). Depending on the information provided the adviser can offer the service at a price or decide not to provide the service due to quality concerns, for example.

It will be noted that in the embodiment described with reference to FIG. 1, the Service Optimiser 18 is implemented as an independent unit. In this case the Service Optimiser 18 can connect to multiple multimedia servers providing different multimedia services to customers. In such scenarios, the Service Optimiser 18 may use different optimisation models for each multimedia service, to optimise the service of each. However, embodiments of the invention can be realised in various other ways. For example, the Service Optimiser 18 can be implemented as part of the IP Multimedia Server 108. In this case, if a provider has multiple IP Multimedia Servers, each one may have an independent implementation of the Service Optimiser 18 unit. Other example embodiments include implementing the optimiser unit 18 as part of a device such as Gateway Device 12 or as part of a user device such as user device 11.

In another example scenario, a method according to an embodiment of the invention may be used to optimise the selection of codecs for VoIP services for a particular xDSL connection to achieve best voice quality. As described earlier, a first step may involve retrieving past performance data for the xDSL line. Such data may include information related to line performance e.g. errored seconds, severely errored seconds, FEC errors, CRC errors, signal-to-noise ratio, attenuation, speed and line configuration (e.g. line profile, retransmission and FEC characteristics, etc.). This data is analysed by the Service Optimiser 18 in order to classify the line performance into a unique profile. The voice quality for that profile using the different available codecs is then measured and the codec with the best performance is chosen. The voice quality for the different profiles can be automatically calculated using an Objective Voice Quality testing model. These models are generally classified as "No-Reference" and "Full-Reference" models depending on whether they have no or full access to a source signal. Among the most notable models for speech quality evaluation are the Full-Reference ITU-T P.862 (PESQ) and ITU-T P.863 (POLQA), and the parametric ITU-T G.107 ("E-Model"). A Full-Reference method such as POLQA can be used to develop optimisation models that relate the performance of different codecs to the performance measurements of different xDSL connections.

Once the performance of the line has been measured and the preferred codec(s) has/have been specified, this information is then passed along to the IMS (or SIP server). If the service is being used for the first time and the performance meets the minimum QoS requirements, the IMS can then grant this client access to the service and decide which codec this customer should use. The system can also be used continuously to optimise the selection of codecs whenever the service is being used. Furthermore, the Service Optimiser 18 can be used to recommend to the IMS (or SIP server) one (best) codec to be used for the service but also can be used to communicate the whole information about the performance of the different codecs to the IMS (or SIP server). This information can be used to influence the negotiation of codecs selected whenever a call is made or received, assuming that call negotiation follows a standard protocol such as SDP, as described in IETF RFC 3264 (i.e. https://tools.ietf.org/html/rfc3264, for which examples are given in RFC 4317: https://tools.ietf.org/html/rfc4317).

In the case of a VoIP service, in some scenarios, other factors may need to be considered when a codec is selected (besides the customer's xDSL performance) such as a remote party's xDSL line performance, the need for interoperation and transcoding, licensing fees, etc. Of course, if the remote party is in the same network and their xDSL performance data is accessible then this system can also be used to optimise the selection of codecs for both xDSL connection and hence optimise the selection of codec for the whole call.

Figure 6:
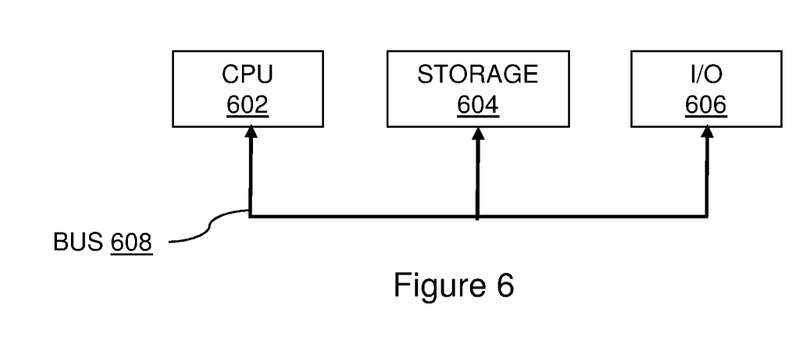
FIG. 6 is a block diagram of a computer system suitable for performing processing steps involved in the operation of embodiments of the present invention.

FIG. 6 is a block diagram of a computer system suitable for the operation of embodiments of the present invention. A central processor unit (CPU) 602 is communicatively connected to a data store 604 and an input/output (I/O) interface 606 via a data bus 608. The data store 604 can be any read/write storage device or combination of devices such as a random access memory (RAM) or a non-volatile storage device, and can be used for storing executable and/or non-executable data. Examples of non-volatile storage devices include disk or tape storage devices. The I/O interface 606 is an interface to devices for the input or output of data, or for both input and output of data. Examples of I/O devices connectable to I/O interface 606 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of selecting an encoding specification for encoding audio and/or video data to be streamed between a user-device and a remote device, the user-device being operable to communicate with the remote device via a digital subscriber line for a portion of a path between the user-device and the remote device, said portion extending between a user-side digital subscriber line modem device and a digital subscriber line aggregation transceiver device, the method comprising:

at either or both of said user-side digital subscriber line modem device and said digital subscriber line aggregation transceiver device, measuring digital subscriber line performance data in respect of data communications at a plurality of different times on the digital subscriber line between the user-side digital subscriber line modem device and the digital subscriber line aggregation transceiver device;

in dependence on the digital subscriber line performance data measured in respect of data communications at said plurality of different times on the digital subscriber line between the user-side digital subscriber line modem device and the digital subscriber line aggregation transceiver device, determining one or more data communication characteristics in respect of data communications over a monitoring period including said plurality of different times on the digital subscriber line between the user-side digital subscriber line modem device and the digital subscriber line aggregation transceiver device; and selecting an encoding specification for encoding said data to be streamed between said user-device and said remote device, the selection of said encoding specification being made in dependence on the data communication characteristics determined in respect of data communications over said monitoring period on the digital subscriber line.

2. A method according to claim 1 wherein the selection step is performed at the user-side digital subscriber line modem device and/or at the digital subscriber line aggregation transceiver device.

3. A method according to claim 1 wherein the one or more data communication characteristics in respect of data communications on the digital subscriber line between the user-side digital subscriber line modem device and the digital subscriber line aggregation transceiver device are provided by the user-side digital subscriber line modem device and/or by the digital subscriber line aggregation transceiver device to a remote service optimisation processor for use in the selection step.

4. A method according to claim 1 wherein the one or more data communication characteristics in respect of data communications on the digital subscriber line between the user-side digital subscriber line modem device and the digital subscriber line aggregation transceiver device are provided to the user-device and/or to the remote device by the user-side digital subscriber line modem device and/or by the digital subscriber line aggregation transceiver device for use in the selection step.

5. A method according to claim 3 wherein the selected encoding specification and/or an indication thereof is provided to said user-device and/or said remote device.

6. A method according to claim 1 wherein the step of selecting an encoding specification comprises selecting a coding technology.

7. A method according to claim 1 wherein the step of selecting an encoding specification comprises selecting one or more encoding parameters for use in encoding audio and/or video data using a selected coding technology, said one or more encoding parameters controlling or affecting one or more of bit-rate, packet loss concealment or forward error correction for the streaming of said audio and/or video data.

8. A method according to claim 1 wherein the method further comprises selecting a decoding specification for decoding audio and/or video data that has been streamed between said user-device and said remote device.

9. A method according to claim 8 wherein the decoding specification is selected in dependence on the encoding specification selected for encoding said audio and/or video data to be streamed between said user-device and said remote device.

10. A method according to claim 1 wherein the method further comprises using the selected encoding specification at said user-device and/or said remote device to encode said data to be streamed between said user-device and said remote device.

11. A method according to claim 10 wherein the method further comprises streaming the encoded data between said user-device and said remote device via the digital subscriber line.

12. A method according to claim 1 wherein the communication characteristics in respect of data communications on the digital subscriber line between the user-side digital subscriber line modem device and the digital subscriber line aggregation transceiver device include one or more characteristics selected from the following:
   characteristics associated with communication speed;
   characteristics associated with communication delay and/or delay variation;
   characteristics associated with reliability;
   characteristics associated with data loss;
   characteristics associated with communications quality.

13. A method according to claim 1 wherein the user-device is located in a local area network and the remote device is located in an external communications network outside said local area network, the user-device being operable to communicate via at least one local area network gateway device with the remote device.

14. A method according to claim 1 wherein the step of measuring digital subscriber line performance data comprises measuring physical layer performance data.

15. A method according to claim 1 wherein the step of selecting an encoding specification for a communication session is performed prior to the initiation of that communication session.

16. A system for selecting an encoding specification for encoding audio and/or video data to be streamed between a user-device and a remote device, the user-device being operable to communicate with the remote device via a digital subscriber line for a portion of a path between the user-device and the remote device, said portion extending between a user-side digital subscriber line modem device and a digital subscriber line aggregation transceiver device, the system comprising:
   a computer processor and a non-transitory computer-readable storage medium storing computer program code such that when the computer program code is executed by the computer processor, the system is configured to:
      at either or both of said user-side digital subscriber line modem device and said digital subscriber line aggregation transceiver device, measure digital subscriber line performance data in respect of data communication at a plurality of different times on the digital subscriber line between the user-side digital subscriber line modem device and the digital subscriber line aggregation transceiver device;
      in dependence on the digital subscriber line performance data measured in respect of data communications at said plurality of different times on the digital subscriber line between the user-side digital subscriber line modem device and the digital subscriber line aggregation transceiver device, determine one or more data communication characteristics in respect of data communications over a monitoring period including said plurality of different times on the digital subscriber line between the user-side digital subscriber line modem device and the digital subscriber line aggregation transceiver device; and
      select an encoding specification for encoding said data to be streamed between said user-device and said remote device, the selection of said encoding specification being made in dependence on the data communication characteristics determined in respect of data communications over said monitoring period on the digital subscriber line.

17. A non-transitory computer-readable storage medium storing computer program code to, when loaded into a computer system and executed thereon, cause the computer system to perform a method of selecting an encoding specification for encoding audio and/or video data to be streamed between a user-device and a remote device, the user-device being operable to communicate with the remote device via a digital subscriber line for a portion of a path between the user-device and the remote device, said portion extending between a user-side digital subscriber line modem device and a digital subscriber line aggregation transceiver device, the method comprising:
   at either or both of said user-side digital subscriber line modem device and said digital subscriber line aggregation transceiver device, measure digital subscriber line performance data in respect of data communication at a plurality of different times on the digital subscriber line between the user-side digital subscriber line modem device and the digital subscriber line aggregation transceiver device;
   in dependence on the digital subscriber line performance data measured in respect of data communications at said plurality of different times on the digital subscriber line between the user-side digital subscriber line modem device and the digital subscriber line aggregation transceiver device, determining one or more data communication characteristics in respect of data communications over a monitoring period including said plurality of different times on the digital subscriber line between the user-side digital subscriber line modem device and the digital subscriber line aggregation transceiver device; and selecting an encoding specification for encoding said data to be streamed between said user-device and said remote device, the selection of said encoding specification being made in dependence on the data communication characteristics determined in respect of data communications over said monitoring period on the digital subscriber line.

* * * * *